M. LOUGHEAD.
BRAKING APPARATUS.
APPLICATION FILED JAN. 22, 1917.
1,249,143.
Patented Dec. 4, 1917.
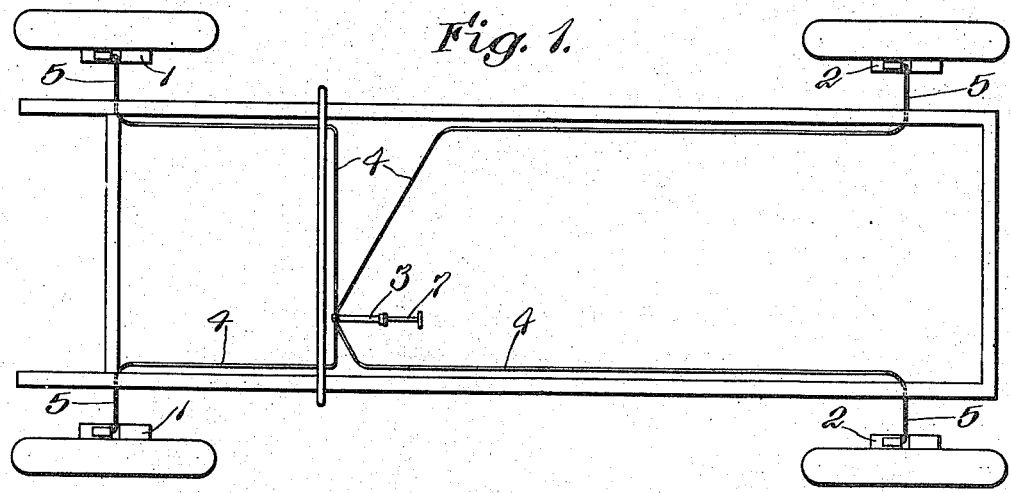
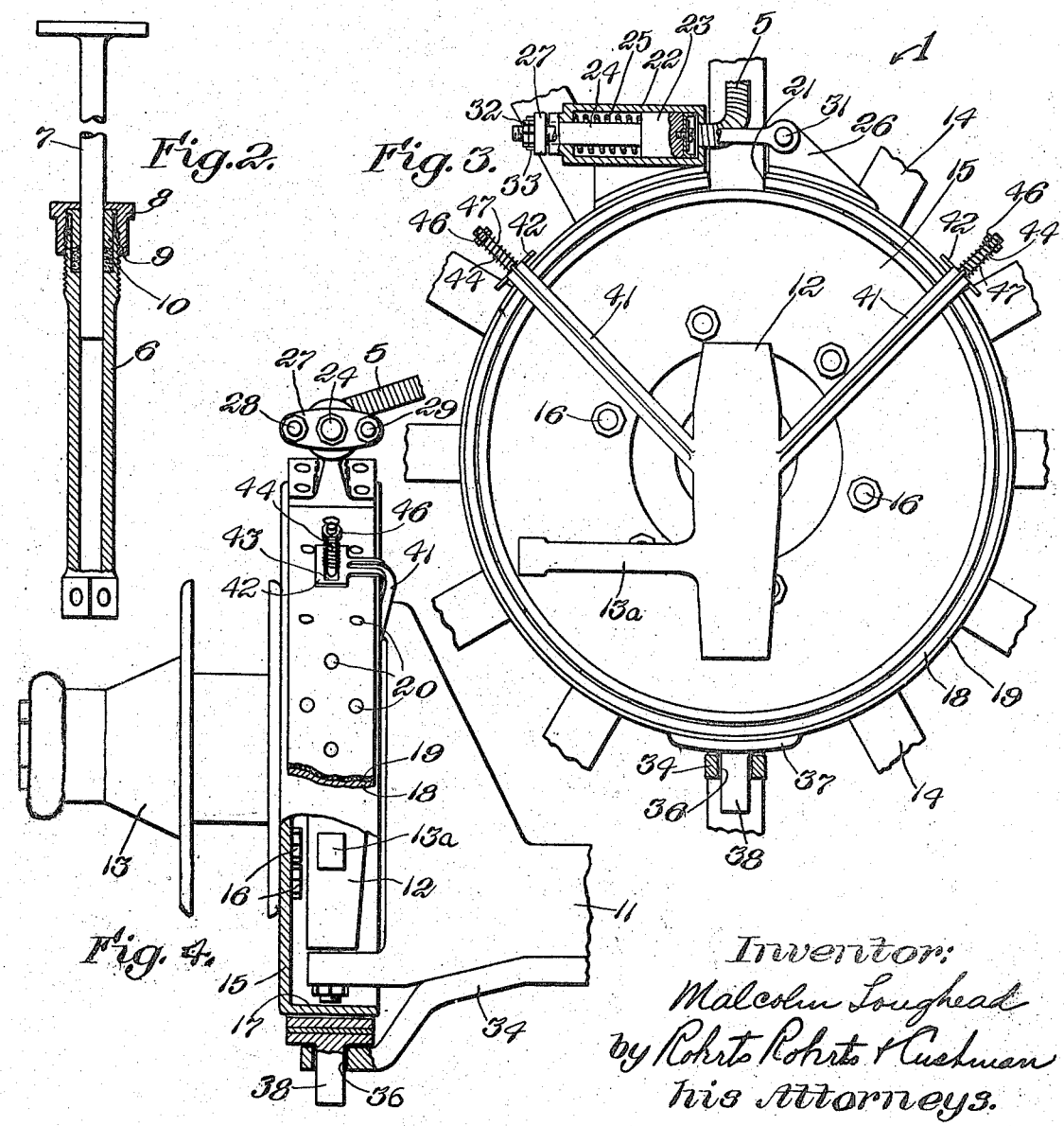
Inventor:
Malcolm Loughead
by Roberts, Roberts & Cushman
his Attorneys.

UNITED STATES PATENT OFFICE.

MALCOLM LOUGHEAD, OF SANTA BARBARA, CALIFORNIA.

BRAKING APPARATUS.

1,249,143.   Specification of Letters Patent.   Patented Dec. 4, 1917.

Application filed January 22, 1917. Serial No. 143,850.

*To all whom it may concern:*

Be it known that I, MALCOLM LOUGHEAD, a citizen of the United States, and resident of Santa Barbara, in the county of Santa Barbara and State of California, have invented new and useful Improvements in Braking Apparatus, of which the following is a specification.

This invention relates to braking apparatus for automobiles and the like, and more particularly to a braking system for automobiles which comprises means for applying braking force to brakes on the wheels through the medium of a fluid instead of through the medium of a train of mechanical links and levers.

The braking systems in common use on automobiles involve a solid rod connecting the braking system with the mechanism at the driver's seat for applying force to the brakes. Owing to the movement of the chassis with relation to the brakes on the wheels there is a continual change in the relationship between the brakes and the means for applying force thereto through the medium of the connecting rod. This involves a change in the adjustment of the brakes as the chassis moves with relation to the wheels due to relative movement of the parts, and also due to variation in the normal position of the chassis with relation to the wheels resulting from changes in the load upon the chassis.

The principal object of my invention is to provide improved means for operating the brakes which is unaffected by changes in the position of the chassis with relation to the brakes. To this end I provide means responsive to fluid under pressure for operating the brakes, means for transmitting fluid under pressure to the responsive means, and means at the driver's position to control the supply of the fluid under pressure to the responsive means.

Further objects of my invention are to provide means for braking the front wheels of an automobile as well as the rear wheels; for producing braking forces at the respective wheels which are substantially equal to each other at all times, thereby to reduce the liability of skidding to a minimum; for transmitting the braking power to the front wheels without interfering with the steering of the wheels; for distributing the braking power evenly to the front wheels when the car is steered in any direction; for producing a greater braking force at the wheels without increasing the range of movement of the foot pedal or other operating means at the driver's position; etc.

Other objects attained by my invention will be apparent from the following description taken in connection with the accompanying drawings, in which Figure 1 is a skeleton view of my braking system applied to an automobile;

Fig. 2 is a vertical longitudinal section of means for supplying fluid under pressure to the brakes, parts being shown in elevation;

Fig. 3 is a detailed view showing the brake mechanism applied to a front wheel, the wheel being shown as detached from the axle bar, parts of the wheel being broken away and parts being shown in section; and Fig. 4 is a detailed elevation of a portion of a front wheel such as illustrated in Fig. 3, the spokes of the wheel being omitted, the connection between the steering knuckle and the axle bar being illustrated, and parts being shown in section.

The particular embodiment of my invention herein disclosed comprises fluid operated brakes 1, mounted at the inside of each of the front wheels, and similar fluid operated brakes 2 mounted at the inside of the rear wheels. The means for supplying fluid under pressure to these brakes comprises plunger mechanism 3, which is preferably foot controlled and which is mounted at the driver's position, and individual pipes 4 connecting the plunger means with each of the brakes at the respective wheels. Any suitable type of conduit may be employed for connecting the plunger means with the brakes but I prefer to employ rigid pipes rigidly mounted upon the chassis, these pipes terminating at the respective wheels in flexible portions 5 to provide for the relative movement of the wheels and chassis.

The plunger mechanism illustrated in detail in Fig. 2 comprises a casing 6 suitably mounted on the chassis, and a plunger 7 fitting smoothly within the casing 6. The upper end of the casing is threaded, and a stuffing box nut 8 is arranged to be threaded thereupon. A stuffing box gland 9 fits within the stuffing box nut and is adapted to compress a suitable packing 10 so as to prevent leakage of the fluid from the casing 6. The casing is preferably mounted beneath the floor of the automobile so that the plunger 7 extends upwardly through the floor in a suitable position to be operated by the foot of the driver.

The braking apparatus mounted on the floating axle of each of the front wheels is illustrated in Figs. 3 and 4, in which 11 represents a portion of the front axle bar, 12 the steering knuckle carrying the axle arm upon which is mounted the wheel comprising a hub 13 and spokes 14. An arm 13ª extending rearwardly from the steering knuckle 12 is provided for the purpose of connecting the steering knuckle with the steering gear. The steering knuckle 12 is pivotally mounted in the end of the axle bar 11 so as to rotate about a nearly vertical axis, the lower pivot of which is shown in Fig 4.

The braking mechanism comprises a drum 15 rigidly mounted on the hub of a wheel by means of bolts 16, the drum having an annular flange 17 extending inwardly from the body portion thereof. About the flange 17 of the brake drum is arranged a brake band 18 surrounded by a forging 19, the brake band and forging being secured together by means of rivets 20. The annular brake ring 18 and forging 19 have a gap in their periphery as indicated at 21 in Fig. 3. Upon one side of this gap is mounted a cylinder 22 having a reciprocating piston 23 therein, and having an opening in its right-hand end adapted to receive the end of the conduit 5. The piston rod 24 extends outwardly through the left-hand end of the cylinder and on the inside of the cylinder is surrounded by a compression spring 25 adapted normally to maintain the piston in the position shown.

A lug 26 is mounted on the forging 19 on the right-hand side of the gap 21 and this lug is pivotally connected to the piston rod 24 by means of a yoke comprising a cross member 27 and two rods 28 and 29 extending through the cross member at the left-hand ends on opposite sides of the cylinder 22 and at the right-hand ends being pivotally connected to the lug 26 by means of a pin 31 extending through the lug. The cross member 27 is provided with a central opening fitting over the end of the piston rod 24 and is adapted to be held in position by means of nuts 32 and 33 threaded on the end of the piston rod 24, one of these nuts serving as a lock nut and the two nuts together serving to position the cross member 27 longitudinally of the piston rod.

In order to prevent the brake ring and supporting forging from rotating with respect to the brake drum as the brakes are applied, a member 34 is secured to the bottom side of the axle bar 11, the member 34 having an opening 36 in the outer end thereof. The member 34 is so positioned that the opening 36 is in alinement with the vertical axis about which the floating axle rotates with respect to the axle bar and a member 37 is suitably secured on the outside of the lower side of the forging 19, the member 37 being provided with a pin 38 fitting through the opening 36 in the member 34. The member 34 and pin 38 are made of considerable size and are rigidly mounted on the respective parts so that rotation of the brake band with respect to the brake drum is thereby prevented. Owing to the fact that the opening 36 and pin 38 are in alinement with the axis of the floating axle, the wheel is free to turn about this axis, and the means for preventing rotation of the brake ring is operative at any angular position of the wheel with respect to the axle bar.

In order to overcome any tendency for the brake ring to become displaced laterally of the brake drum, I preferably provide one or more floating supports for laterally positioning the brake ring without interfering with the movement of the ring along the periphery of the brake drum as the brakes are applied and released. This means preferably comprises T-shaped supporting arms 41 extending laterally and upwardly from the steering knuckle 12, plates 42 being mounted on the ends of supports 41 in spaced tangential relationship to the outer surfaces of the forging 19. The plates 42 are provided with slots 43 disposed lengthwise along the periphery of the brake ring; and upon the outer surface of the forging 19 are rigidly mounted radial pins 44 of slightly smaller diameter than the widths of the slots 43. A pair of nuts 46 are threaded on the outer end of the rods 44, one of the nuts serving as a lock nut, and between these nuts and the plate 42 are disposed compression springs 47 pushing outwardly upon the nuts 46 and thereby yieldingly forcing the brake ring outwardly from the brake drum. The slots 43 are of such length that the movement of the brake ring along the periphery of the brake drum as the brakes are applied and released is permitted without interference of the rods 44 with the plates 42. Thus the brake ring is supported in a floating manner so that it is yieldingly positioned with respect to the brake drum and so that it is prevented from moving laterally with respect to the drum.

The operation of the system is as follows: When the plunger 7 is advanced within the casing 6, the fluid, which is preferably oil, is forced into the cylinders 22, thereby forcing the pistons rearwardly against the action of springs 25. This motion is transmitted through the medium of cross-bar 27 and rods 28 and 29 to the lug 26, the effect being to draw the two ends of the brake ring together, thereby causing the ring to grip and brake the drum. The yoke comprising cross-bar 27 and rods 28 and 29 comprises a strong and rigid connection between the two ends of the brake ring, and owing to the disposition of the rods 28 and 29 on opposite sides of the cylinder 22, the forces are balanced and no turning moment is produced. As the brake members wear and therefore vary in size the variation can be compensated for by advancing the cross-bar farther on to the piston 24.

In the claims annexed hereto I have employed the term "annular brake member" to describe the flange 17 of the drum 15 with the understanding that this term is not limited to a hollow member but also includes a solid member, as for example, a solid drum of the axial thickness of the flange 17. I have also employed the term "a periphery" in reference to the brake member, and this I intend to include either the inner or outer periphery of a brake drum having a flange as illustrated in the drawings, it being understood that my invention is also applicable to brake mechanism in which the brake ring is disposed within instead of without the brake drum.

What I claim is:—

1. In fluid braking apparatus for automobiles and the like, the combination of an annular brake member mounted on a rotary portion of the automobile, a second annular brake member arranged to make frictional engagement with a periphery of the first brake member, the second brake member having a gap in its circumference, a cylinder mounted at one side of the gap, reciprocating means within the cylinder, means for supplying fluid under pressure to the cylinder thereby to reciprocate the reciprocating means therein, and means connecting the reciprocating means with the second brake member on the other side of said gap so that the length of the gap is varied and the pressure between the brake members is controlled by the reciprocation of the reciprocating means within the cylinder, said connecting means being adjustable so as to vary the normal length of said gap.

2. In fluid braking apparatus for automobiles and the like, the combination of a brake drum, a brake ring bearing upon a periphery of the drum, the brake ring having a gap in its circumference, a cylinder mounted on the brake ring on one side of said gap, a piston in the cylinder arranged to be reciprocated in a direction away from said gap by fluid supplied to the cylinder under pressure, and a yoke connecting with the piston and with the brake ring on the other side of said gap so as to cause the brake ring to grip the brake drum when the piston is reciprocated, the yoke comprising members disposed on opposite sides of the cylinder, and means for adjusting the normal length of said gap.

3. In fluid braking apparatus for automobiles and the like, the combination of a brake drum, a brake ring bearing upon the outer periphery of the drum, the brake ring having a gap in its circumference, a cylinder mounted on the brake ring on one side of said gap longitudinally of the gap, a piston in the cylinder arranged to be reciprocated in a direction away from the gap by fluid supplied to the cylinder under pressure, a piston rod extending outwardly through the end of the cylinder opposite said gap, a cross member connecting with the piston rod outside the cylinder, members on opposite sides of the cylinder connecting the cross member with the brake ring on the opposite side of said gap so as to cause the brake ring to grip the brake drum when the piston is reciprocated, and means for adjusting the cross member along the piston rod thereby to vary the normal length of said gap.

Signed by me at Santa Barbara, this 11th day of January, 1917.

MALCOLM LOUGHEAD.